(12) United States Patent
Morimoto et al.

(10) Patent No.: US 7,090,160 B2
(45) Date of Patent: Aug. 15, 2006

(54) SOUND GENERATING DEVICE FOR A DUAL BEARING REEL

(75) Inventors: Shinichi Morimoto, Nishinomiya (JP); Mahimai Das A/L Marimuthu, Skudai (JP)

(73) Assignee: Shimano Inc., Osaka (JP)

( * ) Notice: Subject to any disclaimer, the term of this patent is extended or adjusted under 35 U.S.C. 154(b) by 96 days.

(21) Appl. No.: 10/868,813

(22) Filed: Jun. 17, 2004

(65) Prior Publication Data
US 2005/0006512 A1    Jan. 13, 2005

(30) Foreign Application Priority Data
Jun. 25, 2003    (JP) .............................. 2003-181803

(51) Int. Cl.
*A01K 89/01* (2006.01)

(52) U.S. Cl. ..................................................... 242/307
(58) Field of Classification Search ......... 242/306–308
See application file for complete search history.

(56) References Cited

U.S. PATENT DOCUMENTS

| | | | | |
|---|---|---|---|---|
| 2,336,737 A | * | 12/1943 | Kreis ......................... | 242/308 |
| 2,777,645 A | * | 1/1957 | Wood ......................... | 242/232 |
| 3,138,343 A | * | 6/1964 | Henze ......................... | 242/308 |
| 4,088,279 A | * | 5/1978 | Karlsson et al. ............. | 242/307 |
| 4,570,878 A | * | 2/1986 | Nakajima .................... | 242/261 |
| 6,189,822 B1 | * | 2/2001 | Ikuta .......................... | 242/296 |

FOREIGN PATENT DOCUMENTS

JP    2000-279074 A    10/2000

* cited by examiner

Primary Examiner—Emmanuel Marcelo
(74) Attorney, Agent, or Firm—Shinjyu Global IP Counselors, LLP

(57) ABSTRACT

A sound generating mechanism of a dual bearing reel generates sound by the rotation of a spool, and includes a serrated member, an operation member, a sounding member, a first urging member, and a second urging member. The serrated member includes projections and rotates with the spool. The operation member can come into contact and be separated from the serrated member. The sounding member is pivotably movable in accordance with movement of the operation member between a sound generation position and a release position. The first urging member urges the sounding member toward the rotational center of the serrated member when the sounding member is in the sound generation position. While the sounding member is in the sound generation position, the second urging member applies a greater urging force to the sounding member when the spool rotates in the line-releasing direction than when the spool rotates in the line-winding direction.

20 Claims, 7 Drawing Sheets

SOUND GENERATING DEVICE FOR A DUAL BEARING REEL

BACKGROUND OF THE INVENTION

1. Field of the Invention

The present invention relates to a sound generating device. More specifically, the present invention relates to a sound generating device for a dual bearing reel that generates sound by the rotation of a spool to wind line, the spool being rotatively mounted on a reel unit of the dual bearing reel.

2. Background Information

Known examples of a sound generating device for a dual bearing reel include a sound generating device that is linked to the rotation of the spool, generates sound, and applies resistance to the rotation of the spool. A conventional sound generating device includes a serrated member, an operation member, a sounding member, and an urging member. The serrated member is non-rotatively mounted on a spool shaft. The operation member is mounted to a reel unit and can be moved to contact and to separate from the serrated member. The sounding member that oscillates via the rotation of the serrated member. The urging member urges the sounding member. The serrated member includes a plurality of projections that are aligned spaced apart on the outer periphery thereof in the circumferential direction. The operation member is mounted on the reel unit, and can move in the radial direction of the spool shaft. The sounding member is pivotably mounted on the operation member, and is movable in accordance with movement of the operation member between a sound generation position in which the tip of the sounding member is disposed between the projections of the serrated member and a release position in which the tip of the sounding member is separated from the projections. The urging member urges the sounding member so that the tip of the sounding member will be substantially pointed toward the rotational center of the serrated member when the sounding member is in the sound generation position.

With a conventional sound generating device that is configured as described above, when the operation member is disposed in a position near the sounding member, the sounding member will be disposed in the sound generation position, and the tip thereof can be disposed between the projections. When the spool rotates in this state, the sounding member will oscillate and repeatedly strike the serrated member. Thus, the sound generating device will thereby generate sound. When this operation occurs, the sound generating device will provide a resistance with respect to the rotation of the spool, because the sounding member will repeatedly strike the serrated member. In addition, when the operation member is moved to the separated position, the sounding member will be disposed in a release position in which the tip thereof is separated from between the projections, and thus sound generation will not be possible. As a result, the sound generating device will no longer provide resistance with respect to the rotation of the spool. Thus, if the sound generation and the rotational resistance of the sound generating device can be turned on and off during line winding, the sound generating device can be quieted by placing it in the release state and line winding resistance can be reduced. In addition, during line release, a person fishing can be notified that a fish has been hooked, and line trouble caused by a sudden release of the fishing line can be prevented. Japanese Unexamined Patent Application Publication No. 2000-279074 provides a sound-producing mechanism that can be switched between a sound generating state and a release state.

With the aforementioned conventional sound generating device, the sound generating device will generate approximately the same sound regardless of the rotational direction of the spool and will apply approximately the same rotational resistance to the spool, because the sounding member is urged by the urging member so that the sounding member will point toward the axial center of the spool shaft when the tip of the sounding member is disposed between the projections. However, a dual bearing reel, it is preferable that the rotational resistance be low during line winding and high in the line release direction. Further, it is preferable that a sound that is produced during line winding be louder than that produced during line release in order to notify one that a fish has been hooked. However, with the aforementioned conventional sound generating device, it is difficult for the sound and resistance to be changed in accordance with the direction of rotation because, as noted above, the sounding member is urged by the same urging member toward the axial center of the spool shaft when the tip of the sounding member is disposed between the projections.

In view of the above, it will be apparent to those skilled in the art from this disclosure that there exists a need for an improved sound generating device for a dual bearing reel. This invention addresses this need in the art as well as other needs, which will become apparent to those skilled in the art from this disclosure.

SUMMARY OF THE INVENTION

It is an object of the present invention to allow the sound and resistance of a sound generating device for a dual bearing reel to be easily changed in accordance with the rotational direction.

A sound generating device for a dual bearing reel according to a first aspect of the present invention generates sound by rotation of a spool to wind line that is rotatively mounted on a reel unit of the dual bearing reel. The sound generating device includes a serrated member, an operation member, a sounding member, a first urging member, and a second urging member. The serrated member is a disk shaped member that is relatively unrotatable with the spool, the serrated member having a plurality of projections formed on its outer periphery so as to be spaced apart. The operation member is adapted to be mounted on the reel unit so as to be movable toward and away from the serrated member. The sounding member is pivotably mounted on the operation member. The sounding member is movable in accordance with movement of the operation member between a sound generation position in which the tip of the sounding member can contact the projections of the serrated member and a release position in which the tip of the sounding member cannot contact the projections. The first urging member urges the sounding member so that the tip of the sounding member is pointed substantially toward the rotational center of the serrated member when the sounding member is in the sound generation position. The second urging member applies a greater urging force to the sounding member when the spool rotates in a line-releasing direction than when the spool rotates in a line-winding direction, while the sounding member is in the sound generation position With this sound generating device, when the operation member is moved to a position separated from the serrated member, the sounding member will be disposed in a release position in which the tip thereof is separated from the projections of the serrated member. When the sounding member is moved to a position near the serrated member, the sounding member will be disposed in a sound generation position in which the tip thereof can contact the projections. When the spool rotates in this state, the sounding member will be urged toward the center of the serrated member by the first urging member. Thus, the tip of the sounding member will repeatedly strike the projections. Resistance will be applied with respect to rotation, and the device will generate sound. In addition, when the spool rotates in the line releasing direction, the sounding member is further urged in a direction opposite the pivoting direction by the second urging member. Because the urging force will be stronger in the line winding direction, a larger rotational resistance will be applied and a louder sound will be generated. Here, by providing the second urging member that will urge the sounding member in the pivoting direction and the opposite direction, both a large rotational resistance can be applied and loud sounds can be generated when the rotational direction of the spool is the line release direction. Given this structure, sounds and resistance can be easily changed in accordance with the rotational direction.

A sound generating device for a dual bearing reel according to a second aspect of the present invention is the device set forth in the first invention, in which the second urging member will not does not apply an urging force to the operation member when the operation member is moving toward or away from the serrated member. In this configuration, even if the second urging member is arranged to urge the sounding member, the operation member on which the sounding member is pivotably mounted will not be urged by the second urging member. Thus, when the operation member is moved, the force applied to the operation member will not change and there will be no impact on the operation of the operation member.

A sound generating device for a dual bearing reel according to a third aspect of the present invention is the device set forth in the first or second aspect, in which the second urging member is a torsion coil spring that is wound around the outer periphery of the operation member. Further, a first end of the second urging member is engaged with the sounding member and a second end of the second urging member is engaged with the reel unit. The first end in contacts the sounding member when the sounding member is in the sound generation position, and separates from the sounding member when the sounding member is in the release position. In this configuration, the first end will be separated from the sounding member in the release position even if the second end of the second urging member is engaged with the reel unit, and thus the engagement structure of the second end will be simplified and there will be no impact on the operation of the operation member.

A sound generating device for a dual bearing reel according to a fourth aspect of the present invention is the device set forth in the first or second aspect, in which the second urging member is a torsion coil spring that is wound around the outer periphery of the operation member. Further, a first end of the torsion coil spring is engaged with the sounding member, and a second end of the torsion coil spring is engaged with the operation member. In this configuration, both ends of the second urging member will move together with the operation shaft, and thus there will be no impact on the operation of the operation member.

A sound generating device for a dual bearing reel according to a fifth aspect of the present invention is the device set forth in any of the first to fourth aspects, further including a position retaining mechanism that retains the sounding member in one of the sound generation position and the release position by contacting the operation member. In this configuration, the sounding member will be reliably retained in one of the two positions.

A sound generating device for a dual bearing reel according to a sixth aspect of the present invention is the device set forth in any of the first to fifth aspects, in which the first urging member is a coil spring. Further, one end of the first urging member is engaged with the reel unit, and the other end of the first urging member is engaged with the sounding member. In this configuration, the structure of the first urging member is simplified.

A sound generating device for a dual bearing reel according to a seventh aspect of the present invention is the device set forth in any of the first to sixth aspects, in which the sounding member includes a support portion, an engagement portion, and a pawl. The support portion is pivotably supported by the operation member. The engagement portion extends radially outward from the support portion and is engaged with the first urging member. The pawl portion extends radially outward from the support portion in a direction that is different from a direction in which the engagement portion extends. The pawl portion has a tip that is tapered and comes into contact with the serrated member. In this configuration, the sounding member is composed of the support portion and the pawl portion and engagement portion that project outward from the support portion in different directions.

A sound generating device for a dual bearing reel according to an eighth aspect of the present invention is the device set forth in the seventh aspect, in which the angle formed by the engagement portion and the pawl portion is an acute angle. In this configuration, the engagement portion and the pawl portion project outward forming an acute angle therebetween. Thus, the sounding member is compact and the placement of the sounding member will be simplified.

A sound generating device for a dual bearing reel according to a ninth aspect of the present invention is the device set forth in any of the first through eighth aspects, in which the second urging member does not apply an urging force to the sounding member when the spool rotates in the line-winding direction.

A sound generating device for a dual bearing reel according to a tenth aspect of the present invention is the device set forth in any of the first through ninth aspects, in which the second urging member urges the sounding member by contacting the sounding member from a direction in which the sounding member swings when the spool rotates in the line-releasing direction.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
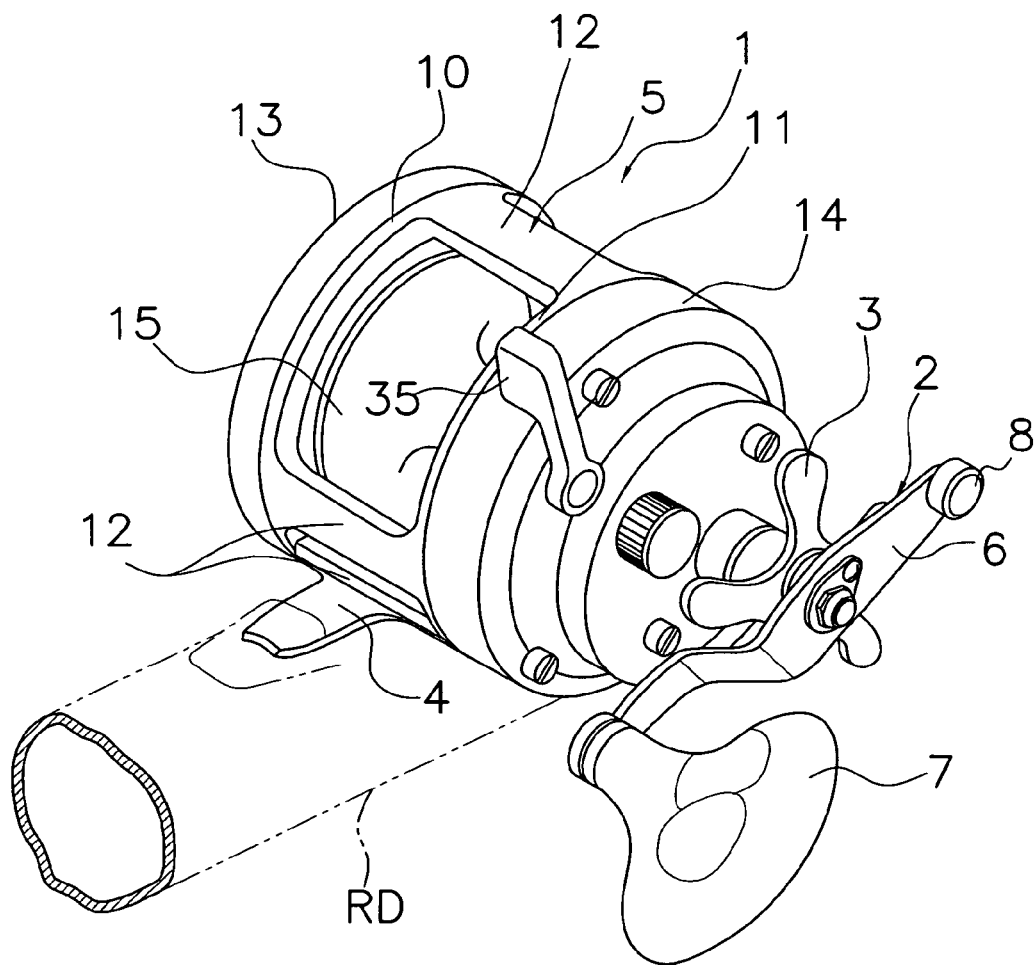
FIG. 1 is a rear perspective view of a dual bearing reel in accordance with a preferred embodiment of the present invention.
Figure 2:
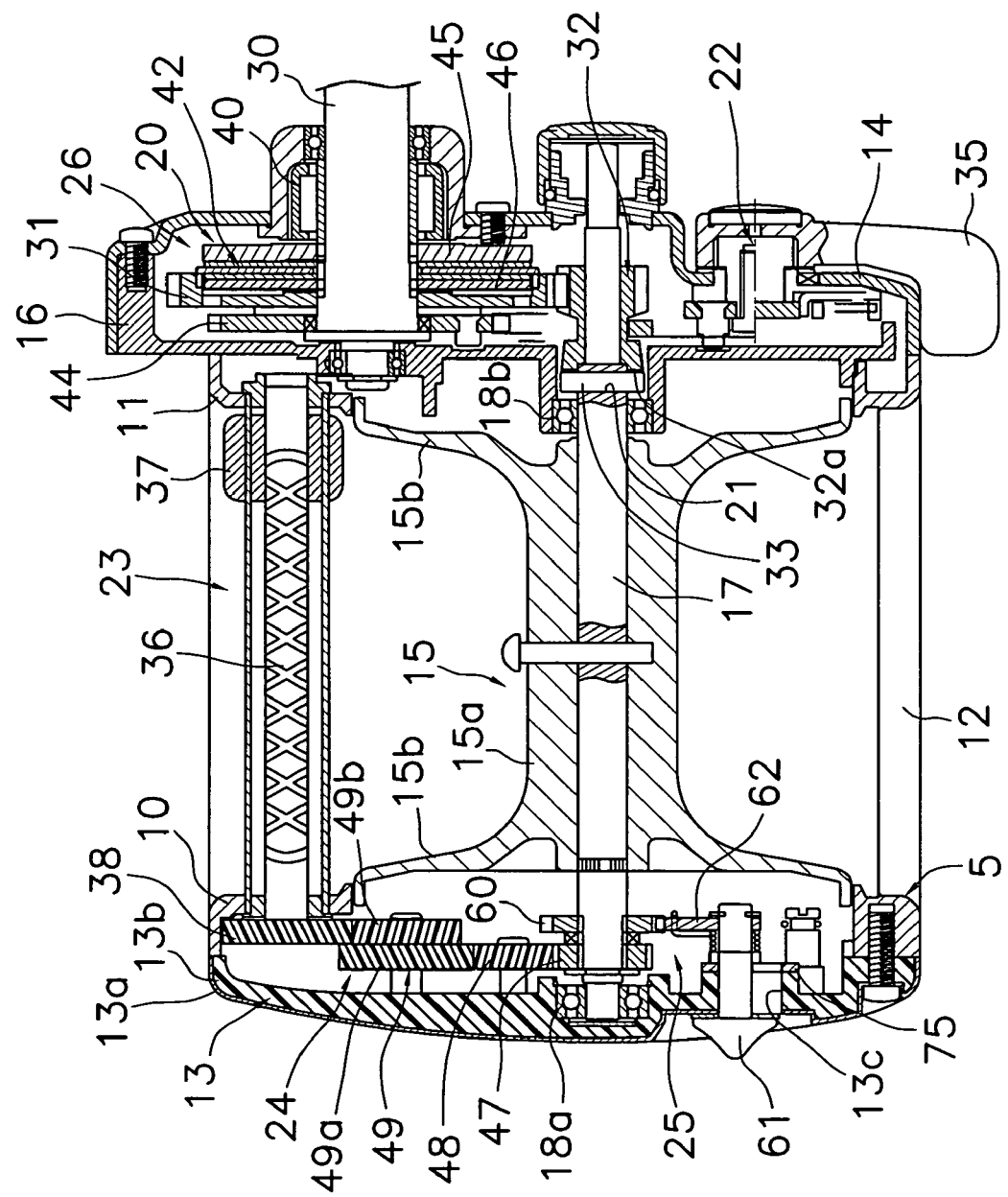
FIG. 2 is a cross-sectional view of the dual bearing reel in accordance with the preferred embodiment of the present invention.

FIG. 1 illustrates a medium sized round type of dual bearing reel in accordance with a preferred embodiment of the present invention. The dual bearing reel includes a reel unit 1, a handle assembly 2, and a star drag 3. The handle assembly 2 is provided to rotate a spool 15 that is disposed sideways in the reel unit 1. The star drag 3 is disposed on the handle assembly 2 side of the reel unit 1. The spool 15 is rotatively mounted on the reel unit 1. The reel unit 1 is mounted on a fishing rod RD via a rod attachment leg 4. As shown in FIG. 2, the reel unit 1 includes a frame 5 a first cover 13, a second cover 14, and a mechanism mounting plate 16. The frame 5 has a pair of left-right side plates 10 and 11 that are disposed across a predetermined gap and a plurality of connecting members 12 that connect the side plates 10 and 11. The first cover 13 and the second cover 14 are screwed to both sides of the frame 5 and fixedly coupled thereto. The mechanism mounting plate 16 is mounted on the second cover 14. The mechanism mounting plate 16 is disposed to contact the second side plate 11. Furthermore, a space is formed between the mechanism mounting plate 16 and the second side cover 14 in order to accommodate various mechanisms described below.

The frame 5 is preferably obtained by die cast molding. The first cover 13 includes a cover member 13a that is obtained by press-molding a thin metal sheet, and an inner side portion 13b that is made of a synthetic resin. The cover member 13a and the inner side portion 13b are assembled together and fixedly attached to the side plate 10 of the frame 5 by screws. The second cover 14 is preferably obtained by press-molding a thin metal sheet. The pair of side plates 10 and 11, the first cover 13, and the second cover 14 are each circular in shape when viewed laterally. Further, the outer peripheral surfaces of the side plates 10 and 11, the first and second covers 13 and 14 are machined using, for example, a lathe or the like. A mounting portion of a handle shaft 30 (described below) bulges outward in the axial direction from a central portion of the second cover 14.

The connecting members 12 are flat members that are integrally formed with both side plates 10 and 11 in a shape that runs along the outer periphery of both side plates 10 and 11, and connect the pair of side plates 10 and 11 at three locations, for example, the rear portion, the lower portion and the upper portion of the reel unit 1. Thus, by integrally forming the side plates 10 and 11 with the plurality of connecting members 12, bending deformation and the like will not occur. Further, a decrease in winding efficiency will be suppressed, even if a large load is applied to the reel unit 1. The outer peripheral portion of the connecting members 12 and the side plates 10 and 11 are integrally formed, and are preferably machined in the same way as the first cover 13.

As seen in FIG. 1, the rod attachment leg 4 is fixedly attached to the connection member 12 on the lower portion. The rod attachment leg 4 is disposed to run along a central position between the side plates 10 and 11 of the frame 5. The central position is also the central position of the line winding portion of the spool 15.

As shown in FIGS. 1 and 2, the handle assembly 2 includes a crank arm 6, a handle knob 7, and a balance member 8. The crank arm 6 is non-rotatably mounted on a tip of the handle shaft 30. The handle knob 7 is rotatively mounted on one end of the crank arm 6 and rotates on a shaft that is perpendicular to the end portion of the crank arm 6. The balance member 8 is mounted to the other end of the crank arm 6, i.e. the end opposite the handle knob 7. The crank arm 6 is bent along the length thereof such that the handle knob 7 side is closer to the reel unit 1 than the balance member 8 side.

As shown in FIG. 2, the spool 15 is rotatively disposed between the pair of side plates 10 and 11. The spool 15 includes a bobbin portion 15a, and a pair of flange portions 15b formed integrally on both ends of the bobbin portion 15a. A spool shaft 17 is passed through and fixedly mounted in the center of the spool 15. The spool shaft 17 is rotatively supported by the first cover 13 and the mechanism mounting plate 16 via bearings 18a and 18b.

A first rotation transmission mechanism 20, a clutch mechanism 21, and a clutch operation mechanism 22 are disposed in the space between the mechanism mounting plate 16 and the second cover 14. The first rotation transmission mechanism 20 transmits torque from the handle assembly 2 to the spool 15. The clutch mechanism 21 is arranged along the first rotation transmission mechanism 20. The clutch operation mechanism 22 activates and deactivates the clutch mechanism 21. In addition, a level wind mechanism 23 that winds uniformly fishing line onto the spool 15 is disposed on the front side of the spool 15. Furthermore, a second rotation transmission mechanism 24 that transmits the rotation of the spool 15 to the level wind mechanism 23, and a spool sound generating mechanism 25 that generates sound by the rotation of the spool 15, are disposed between the first cover 13 and the side plate 10.

The first rotation transmission mechanism 20 includes a rotation control mechanism 26 that regulates torque when torque from the spool 15 is transmitted back to the handle assembly 2. The first rotation transmission mechanism 20 also includes a handle shaft 30, one end of which is fixedly coupled to the handle assembly 2, a main gear 31 that is connected to the other end of the handle shaft 30 via the rotation control mechanism 26, and a pinion gear 32 that meshes with the main gear 31. The handle shaft 30 is disposed parallel to the spool shaft 17, and is rotatably supported on its one end by the mechanism mounting plate 16. The main gear 31 is rotatively mounted with respect to the handle shaft 30. Furthermore, the main gear 31 can be non-rotatably connected relative to one end of the handle shaft 30 via the rotation control mechanism 26. With the aforementioned configuration, torque from the handle assembly 2 will be directly transmitted to the spool 15 via the main gear 31 and the pinion gear 32 when the clutch mechanism 21 is activated.

The clutch mechanism 21 includes a tubular pinion gear 32 that is slidably mounted to the outer peripheral portion of the spool shaft 17, and a pin 33 that is mounted in an engagement groove 32a that is disposed in a portion of the pinion gear 32 and in the spool shaft 17. When the pinion gear 32 slides along the spool shaft 17 and the pin 33 engages with the engagement groove 32a, rotational force will be transmitted between the spool shaft 17 and the pinion gear 32. This state is the connected state (the clutch on state). If the pin 33 is disengaged from the engagement groove 32a, the rotational force will not be transmitted between the spool shaft 17 and the pinion gear 32. This state is the disconnected state (the clutch off state). In the clutch off state, the spool 15 will freely rotate. The pinion gear 32 is urged in a direction in which the engagement groove 32a and the pin 33 will engage, i.e., in the clutch on state, by the clutch operation mechanism 22. The clutch operation mechanism 22 includes a clutch lever 35 that is pivotably mounted between a connected posture and a disconnected posture on the second cover 14 of the reel unit 1.

The rotation control mechanism 26 includes a roller-type one way clutch mechanism 40, a drag mechanism 42, and a pawl type ratchet mechanism 44. The one way clutch mechanism 40 allows the handle shaft 30 to rotate only in the line winding direction (i.e., preventing rotation in the line releasing direction). The drag mechanism 42 applies a set drag force to the rotation of the spool 15 in the line releasing direction. The pawl type ratchet mechanism 44 allows the handle shaft 30 to rotate only in the line winding direction. Note that if only the reverse rotation of the handle shaft 30 is to be prevented (rotation in the line releasing direction), only the ratchet mechanism 44 may be provided and the one way clutch mechanism 40 may be omitted. However, it will take a certain amount of time for the ratchet pawl of the ratchet mechanism 44 to mesh with and to disengage from the ratchet wheel. The aforementioned roller-type one way clutch mechanism 40 is preferred in order to carry out a rapid and smooth reverse rotation prevention operation during fishing, because excessive force that cannot be borne by the one way clutch mechanism 40 will be borne by the ratchet mechanism 44.

The drag mechanism 42 can adjust the drag force when the clutch is on by operation of the star drag 3 that meshes with the handle shaft 30. The drag mechanism 42 includes a main gear 31, a disk member 45 that is disposed adjacent to the one way clutch mechanism 40, and a plurality of drag disks 46 that are disposed between the main gear 31 and the disk member 45. The disk member 45 is non-rotatably engaged with an inner race of the one way clutch mechanism 40, and the rotation of the disk member 45 in the line releasing direction is prevented. The drag mechanism 42 can apply drag force to the spool 15 via the main gear 31 when releasing line by pressing the main gear 31 into contact with the disk member 45 via the plurality of drag disks 46.

As shown in FIG. 2, the level wind mechanism 23 includes a worm shaft 36 that is disposed forward of the spool 15 and parallel with the spool shaft 17, and a fishing line guide portion 37 that engages with the worm shaft 36 and reciprocally moves in the spool shaft direction. The worm shaft 36 is rotatively mounted between both side plates 10 and 11. A driven gear 38 that forms the second rotation transmission mechanism 24 is mounted on an end portion of the worm shaft 36 on the side plate 10 side. The fishing guide portion 37 reciprocates in the spool shaft direction by the rotation of the worm shaft 36 and guides fishing line to the spool 15.

Figure 3:
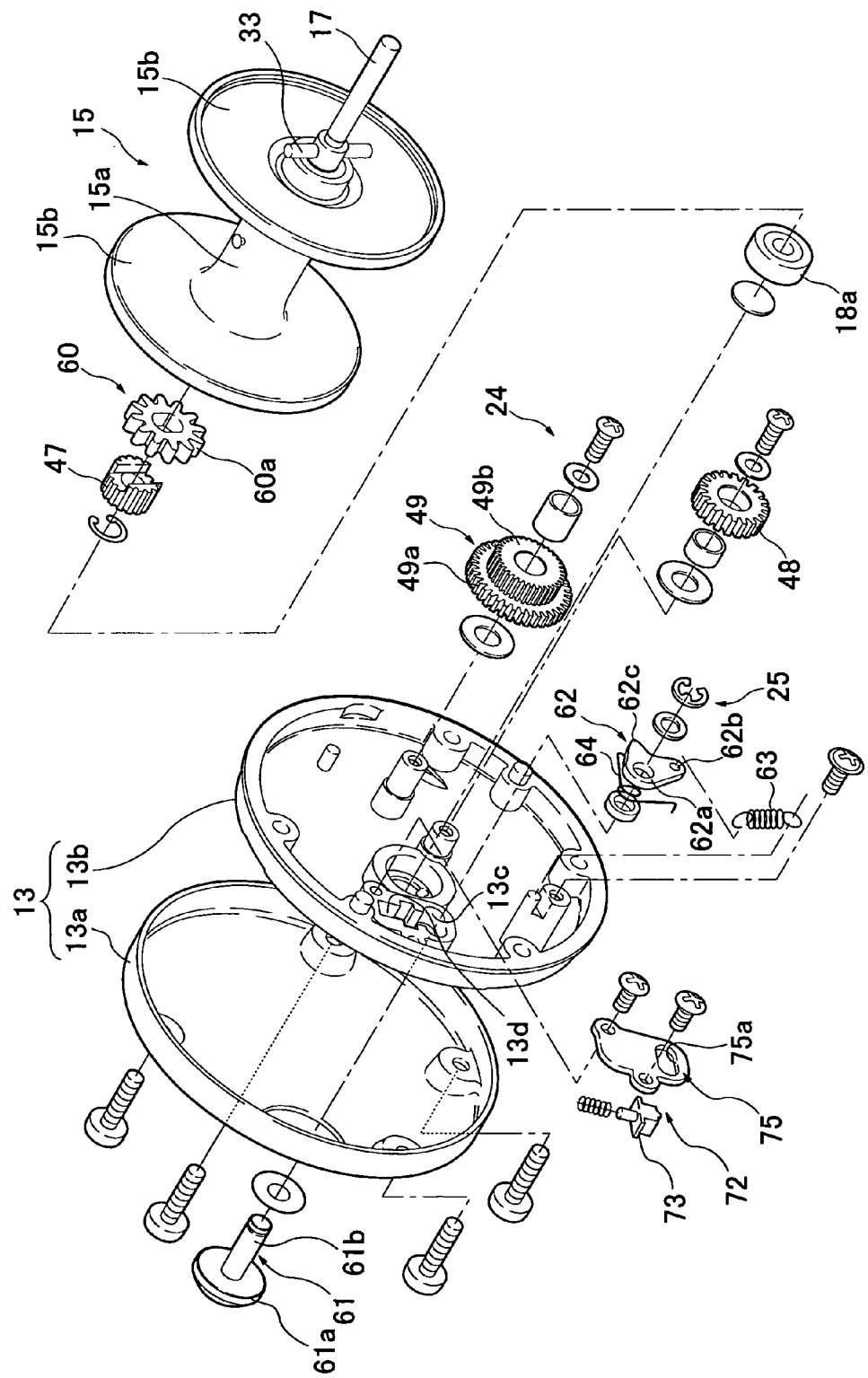
FIG. 3 is an exploded perspective view of a left side portion of the reel in accordance with the preferred embodiment of the present invention.
Figure 4:
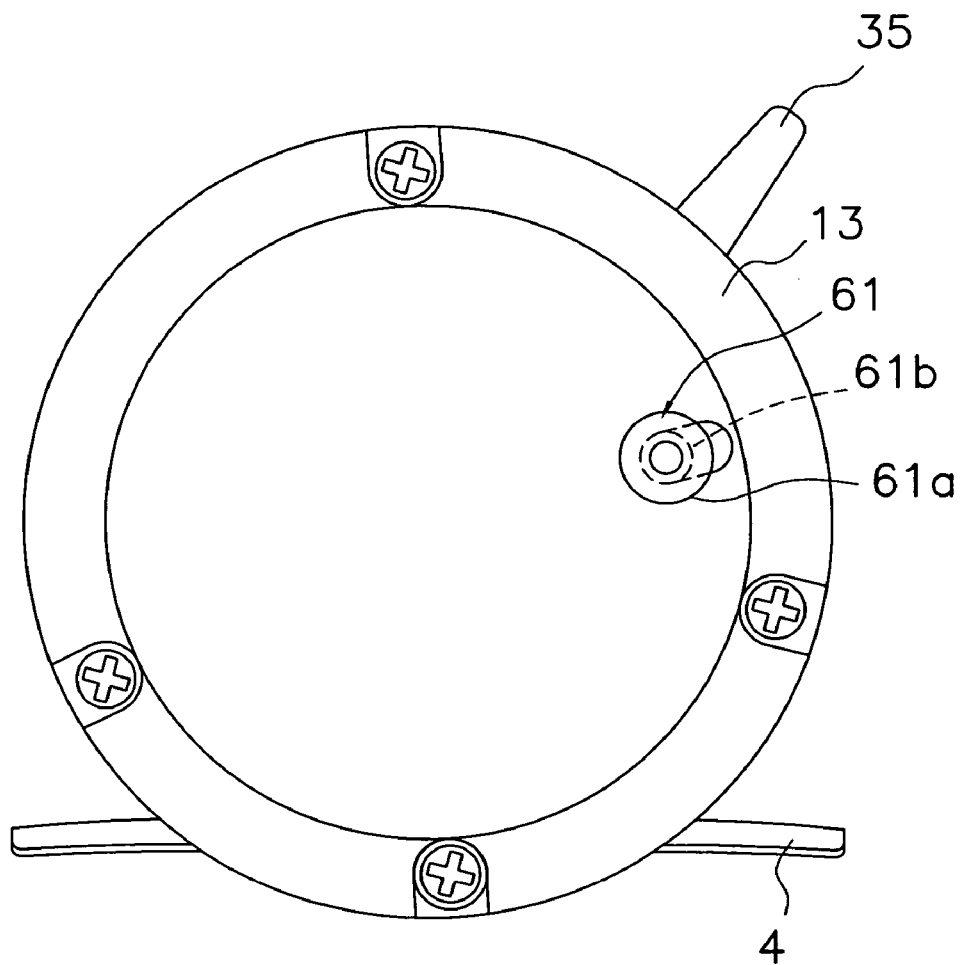
FIG. 4 is a right side view of the reel in accordance with the preferred embodiment of the present invention.
Figure 5:
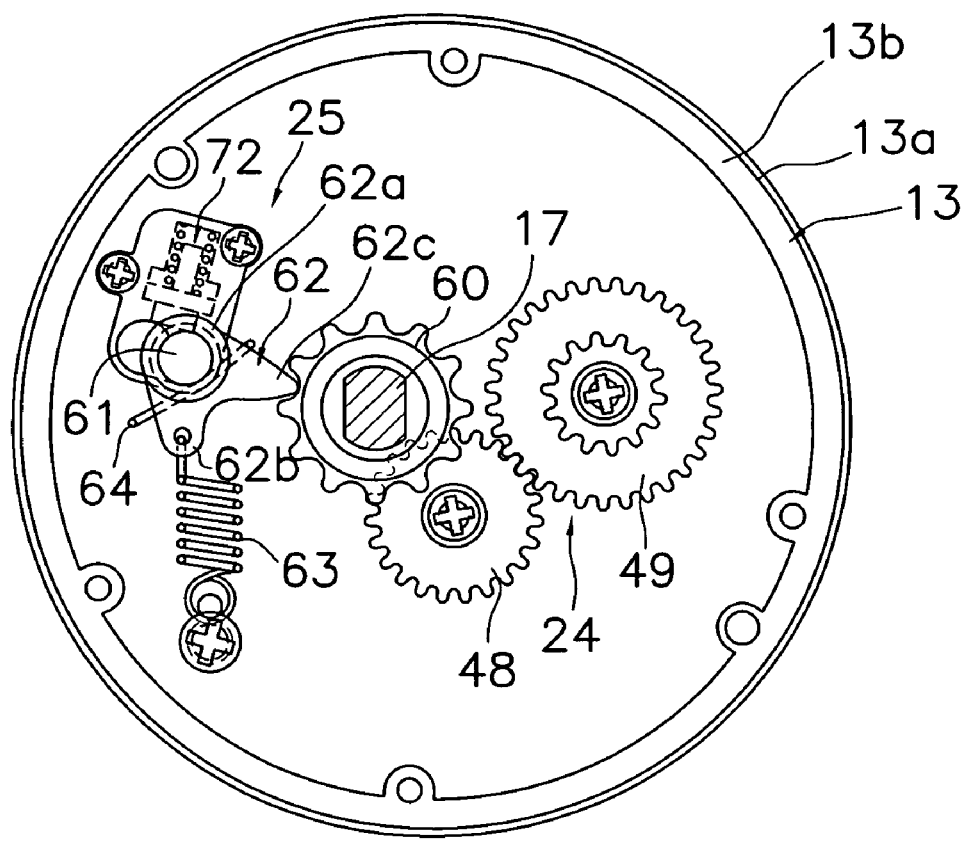
FIG. 5 is a view from an inner side of a first cover of the reel in accordance with the preferred embodiment of the present invention.

As shown in FIGS. 2 and 3, the second rotation transmission mechanism 24 includes a drive gear 47, a first intermediate gear 48, a second intermediate gear 49, and the driven gear 38. The drive gear 47 is non-rotatably mounted on the spool shaft 17. The first intermediate gear 48 meshes with the drive gear 47. The second intermediate gear 49 meshes with the first intermediate gear 48. The driven gear 38 meshes with the second intermediate gear 49. Both intermediate gears 48 and 49 are rotatively mounted on the inner side surface of the first cover 13. The second intermediate gear 49 includes a large diameter gear 49a that meshes with the first intermediate gear 48, and a small diameter gear 49b that meshes with the driven gear 38 that is mounted on the worm shaft 36. The second rotation transmission mechanism 24 transmits the rotation of the spool 15 to the worm shaft 36 so that the phase will shift, and will prevent fishing line from being wound onto the same location on the bobbin portion 15a.

As shown in FIGS. 3 to 6B, the spool sound generating mechanism 25 is capable of generating sound in response to the rotation of the spool 15, and is capable of switching between a state in which sound can be generated and a state in which sound cannot be generated. The spool sound generating mechanism 25 includes a serrated member 60, an operation member 61, a sounding member 62, and first and second urging member 63 and 64. The serrated member 60 is connected to and rotates with the spool 15. The operation member 61 is mounted on the first cover 13 and can move in directions so as to engage with and to disengage from the serrated member 60. The sounding member 62 is pivotably mounted on the operation member 61. The first and second urging members 63 and 64 urge the sounding member 62. The serrated member 60 is a disk-shaped member that is non-rotatably mounted on the spool shaft 17, and has a plurality of projections 60a formed in a row on the outer periphery thereof spaced apart in the circumferential direction.

Figure 6A:
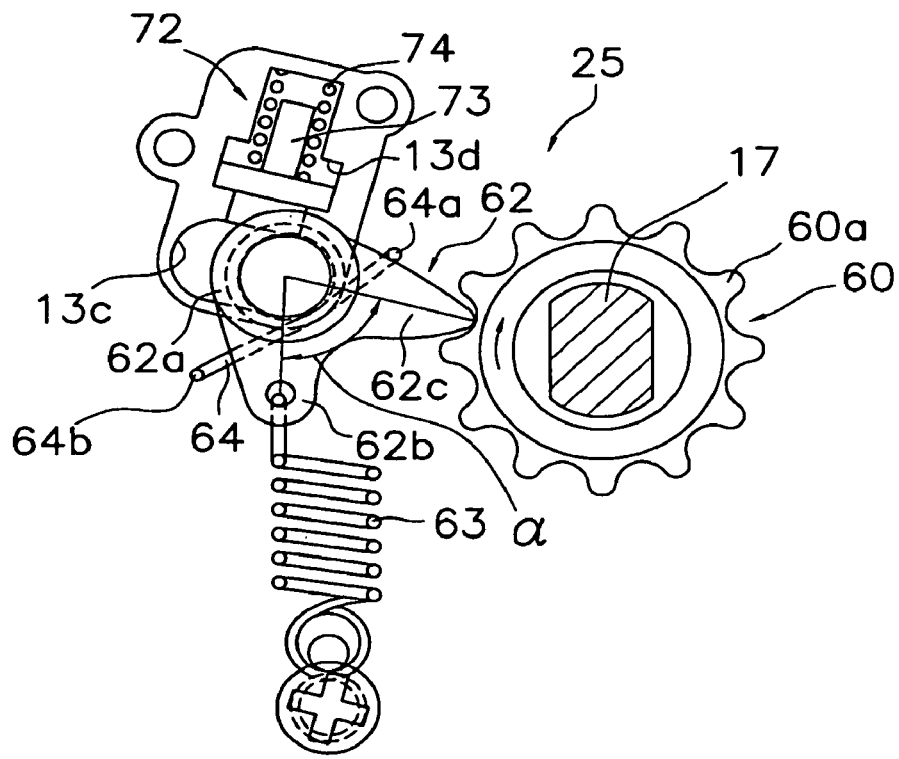
FIG. 6A is an enlarged view of an operation member of the reel in a sound generation possible position in accordance with the preferred embodiment of the present invention.
Figure 6B:
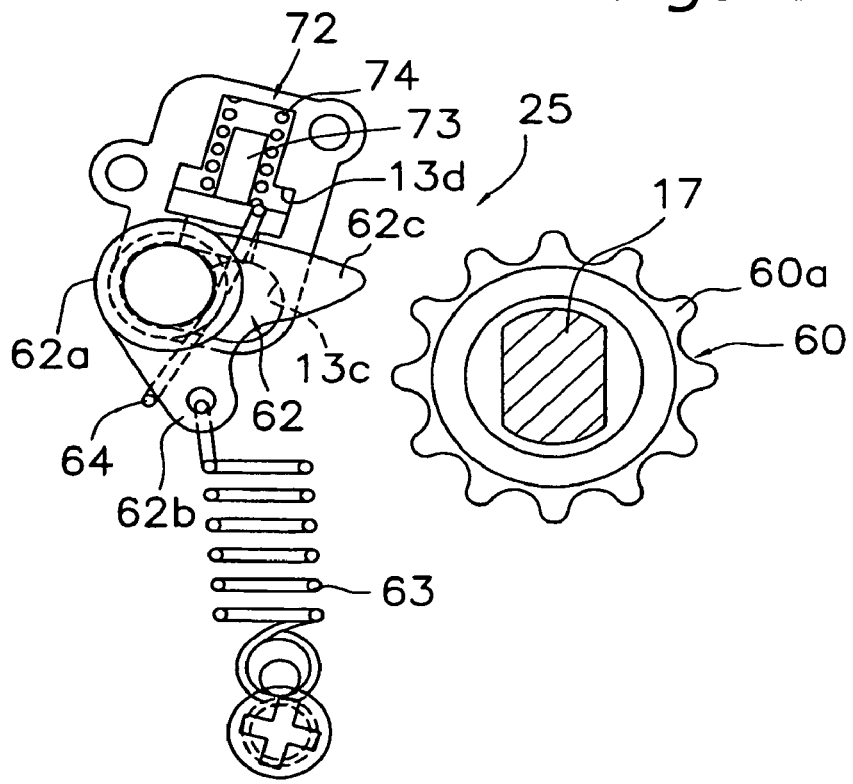
FIG. 6B is an enlarged view of the operation member in a position in which sound generation is not possible in accordance with the preferred embodiment of the present invention.

The operation member 61 is mounted on the first cover 13 and can move between two positions, a front side sound generation position shown in FIG. 6A and a rear side non sound generation position shown in FIG. 6B. The operation member 61 passes through and is mounted on the first cover 13. The operation member 61 includes a large diameter knob portion 61a that is used to operate the operation member 61, and a shaft portion 61b that is unitarily formed with the knob portion 61a. The shaft portion 61b is supported by an oval-shaped support hole 13c that is formed in an inner side portion 13b of the first cover 13, such that the shaft portion 61b can move forward and backward within the support hole 13c. The sounding member 62 is pivotably supported by the shaft portion 61b, and when the operation member 61 is at the sound generation position, the sound generating mechanism 25 is capable of generating sound. The shaft portion 61b is movably maintained in the sound generation possible position and the non sound generation position by a torque mechanism 72, which is an example of the position maintaining means.

The torque mechanism 72 includes a retaining portion 73 that is disposed between the sound generation position and the non sound generation position, and a coil spring 74 that urges the retaining portion 73 downward in FIG. 6A. The retaining portion 73 is mounted in a mounting recess 13d that is continuous with the support hole 13c and formed in the inner side portion 13b. The retaining portion 73 can move in the engage and disengage directions in the support hole 13c. The retaining portion 73 is a cylinder shaped member having a peak on the tip thereof, and during the movement of the operation member 61, rises when the shaft portion 61b contacts the retaining portion 73, and lowers when the shaft portion 61b is not in contact therewith and thus will retain the shaft portion 61b in the post-movement position. Note that the mounting recess 13d will be closed with a lid member 75 that has an oval hole 75a formed therein having the same shape as the support oval 13c. This will prevent the retaining portion 73 and the coil spring 74 from falling out.

The sounding member 62 is a plate shaped member that is curved with a large acute angle along its length. The sounding member 62 is moveable in accordance with the operation member 61 between a sound generation position in which the tip portion of the sounding member 62 is disposed between the projections 60a and a release position in which the tip portion is separated from the projections 60a. The sounding member 62 includes a support portion 62a, an engagement portion 62b, and a pawl portion 62c. The support portion 62a is pivotably supported by the shaft portion 61b of the operation member 61. The engagement portion 62b is a base end portion that extends outward from the support portion 62a in the radial direction. The tip of the engagement portion 62b is engaged with the first urging member 63. The pawl portion 62c is a tip portion that extends outward from the support portion 62a in the radial direction in a direction different from a direction in which the engagement portion 62b extends. The engagement portion 62b and the pawl portion 62c form an acute angle α therebetween, as shown in FIG. 6A. The tip of the pawl portion 62c is tapered and disposed between the projections 60a of the serrated member 60. The angle in the radial direction formed by the engagement portion 62b and the pawl portion 62c is preferably an acute angle. The sounding member 62 is movable, in accordance with the movement in the forward and backward direction of the operation member 61, between a sound generation position in which the pawl portion 62c is disposed between the projections 60a of the serrated member 60, and a release position in which the pawl portion 62c is separated from the projections 60a. Further, when disposed in the sound generation position, the sounding member 62 will oscillate and repeatedly strike the projections 60a due to the rotation of the projection member 60 and thereby generate sound.

The first urging member 63 is preferably a coil spring, one end of which is engaged with the first cover 13, and the other end thereof is engaged with the engagement portion 62b. The first urging member 63 urges the sounding member 62 so that the pawl portion 62c of the sounding member 62 will be substantially pointed toward the rotational center of the serrated member 60 when the sounding member 62 is in the sound generation position. In other words, when the first urging member 63 is in the free length state, the posture of the sounding member 62 will be maintained such that a straight line that connects the pawl portion 62c of the sounding member 62 with the axial center of the shaft portion 61b of the operation member 61 substantially intersects with the axial center of the spool shaft.

The second urging member 64 is a torsion coil spring which is wound around the outer periphery of the operation member 61. Thus, the second urging member 64 does not urge the operation member 61 while the operation member 61 is moving toward or away from the serrated member 60. A first end 64a of the second urging member 64 is engaged with the pawl portion 62c of the sounding member 62 and a second end 64b is engaged with the inner side portion 13b of the first cover 13 while the sounding member 62 is in the sound generation position. While the sounding member 62 is in the sound generation position as shown in FIG. 6A, the second urging member 64 urges the sounding member 62 more when the serrated member 60 rotates in the line-releasing direction, i.e., the direction of the arrow shown in FIG. 6A, than when the serrated member 60 rotates in the line-winding direction. In other words, when the spool 15 is rotated in the direction in which line is released, the second urging member 64 urges the sounding member 62 in a direction opposite the direction in which the sounding member 62 will pivot due to the rotation of the serrated member 60. More specifically, as shown in FIG. 6A, when the spool 15 and the serrated member 60 rotate in the line-releasing direction (the direction of arrow in FIG. 6A), the second urging member 64 will urge the sounding member 62 in the clockwise direction of FIG. 6A, which is a direction opposite the direction in which the sounding member 62 will pivot due to the rotation of the serrated member 60. The first end 64a of the second urging member 64 will contact the pawl portion 62c of the sounding member 62 when the sounding member 62 is in the sound generation position shown in FIG. 6A, and the first end 64a will separate from the pawl portion 62c of the sounding member 62 when the sounding member 62 is in the release position shown in FIG. 6B. In contrast, when the sounding member 62 is moved to the release position, urging force of the second urging member 64 will not be applied to the operation member 61 and the second urging member 64 will no longer impact the operation of the operation member 61.

Operation of the Reel

Next, the operation of the reel will be described.

Referring to FIGS. 1, 2, 6A, and 6B, for example, before engaging in a type of fishing in which live bait is used, the star drag 3 will be rotated to adjust the strength of the drag force of the drag mechanism 42 so that the fishing line will not be drawn out by the live bait.

When the drag force is adjusted, a spring balance or a weight having the about the same weight as the targeted fish will be connected to the end of the fishing line with the clutch mechanism 21 in the on state. Then, the connected scale or weight will be pulled and the star drag 3 will be rotated so that the desired drag force will be produced.

When fishing line is to be released, the clutch mechanism 21 will be placed in the clutch off state by the clutch lever 35. In addition, the operation member 61 will be moved to the non sound generation position side. When the operation member 61 is moved to a braking release position side, the sounding member 62 will be separated from the serrated member 60 as shown in FIG. 6B and the spool sound generating mechanism 25 will be in the non sound generation state. Thus, the spool 15 will be in the free rotation state, the spool 15 will rotate in the line releasing direction due to the dead weight of the tackle, and the fishing line will be released from the spool 15.

When the tackle arrives at a predetermined water depth and the person fishing is waiting for a fish to strike, the operation member 61 will be moved to the sound generation position side. When the operation member 61 is moved to the sound generation position side, the sounding member 62 contacts the serrated member 60 as shown in FIG. 6B and the spool sound generating mechanism 25 will be in the sound generation possible state. As a result, a braking force will be applied to the spool 15 by the spool sound generating mechanism 25, and the release of the fishing line will stop. The person fishing will wait for a fish strike in this state.

If a fish is hooked, the spool 15 will rotate in the line release direction and the spool sound generating mechanism 25 generates loud sounds having short intervals. When this occurs, the sounding member 62 is urged by both the first urging member 63 and the second urging member 64, and thus sounds will be generated that are loud. In contrast, when the spool 15 is rotated in the line winding direction, the second urging member 64 does not urge the sounding member 62. Since the sounding member 62 is urged only by the first urging member 63 rather than both of the first and second urging members 63 and 64, the spool sound generating mechanism 25 generates louder sounds when the spool 15 rotates in the line release direction. When this occurs, the person fishing will operate the clutch lever 35 to place the clutch mechanism 21 in the on state, and the drag mechanism 42 will be placed in the operational state. Then, the hook will be set in the fish, the operation member 61 will be moved to the non sound generation position side, the spool 15 will be rotated in the line winding direction by the handle assembly 2 with the rotational resistance during winding in the reduced state, and the fish will be taken in.

Here, by providing the second urging member 64 that will urge in the pivot direction and the opposite direction, both a large rotational resistance can be applied and loud sounds can be generated when of the spool 15 rotates in the line release direction. Given this structure, sounds and resistance can be easily changed in accordance with the rotational direction.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

ALTERNATE EMBODIMENTS

Alternate embodiments will now be explained. In view of the similarity between the first and second embodiments, the parts of the alternate embodiments that are identical to the parts of the first embodiment will be given the same reference numerals as the parts of the first embodiment. Moreover, the descriptions of the parts of the alternate embodiments that are identical to the parts of the first embodiment may be omitted for the sake of brevity.

Figure 7:
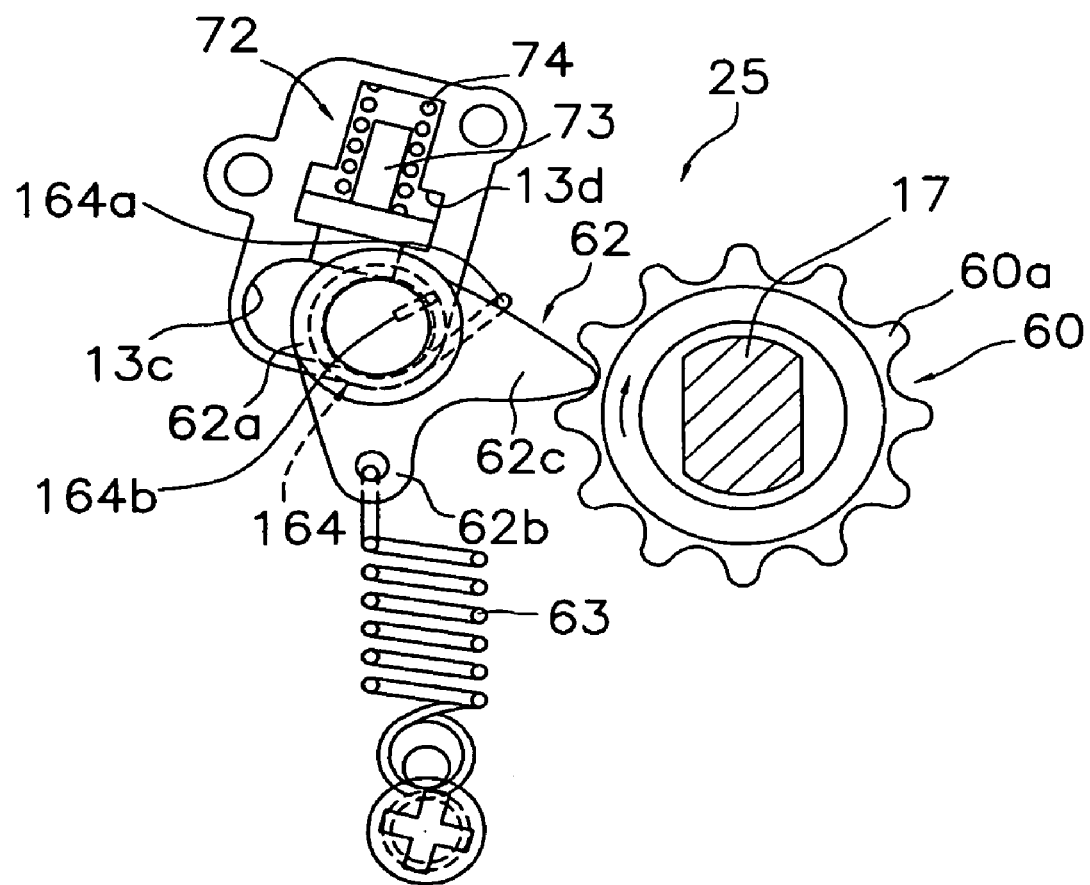
FIG. 7 is an enlarged view of an operation member of the reel in a sound generation possible position in accordance with an alternate embodiment of the present invention.

(a) In the aforementioned embodiment, the second end 64b of the second urging member 64 is engaged with the first cover 13 (the reel unit). However, as seen in FIG. 7, the second end 164b of the second urging member 164 may be engaged with the operation member 61. In this configuration as well, the urging force does not have any impact on the operation of the operation member 61.

(b) In the aforementioned embodiment, the spool sound generating mechanism 25 generates sound by coming into contact with the serrated member 60 provided on the spool shaft 17. However, the configuration of the spool sound generating mechanism 25 is not limited to the aforementioned embodiment. For example, the serrated member 60 may be provided on the spool 15, brought into direct contact with the sounding member 62, and thereby cause sound to be generated. In this configuration, the sounding member 62 may be switched between a position that contacts with the spool 15 and a position that is separated therefrom.

(c) In the aforementioned embodiment, the first urging member 63 is formed from a coil spring, and the second urging member 64 is formed from a torsion coil spring. However, the configuration of the first and second urging members is not limited to a coil spring and a torsion coil spring, and may be a plate spring or a spring having another configuration.

According to the present invention, by providing the second urging member that will urge the sounding member in the pivot direction and the opposite direction, both a large rotational resistance can be applied and loud sounds can be generated when the spool rotates in the line release direction. Because of this, sounds and resistance can be easily changed in accordance with the rotational direction.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-181803. The entire disclosure of Japanese Patent Application No. 2002-181803 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A sound generating device for a dual bearing reel that generates sound by rotation of a spool for winding line that is rotatively mounted on a reel unit of the dual bearing reel, the sound generating device comprising:
    a disk shaped serrated member that is relatively unrotatable with the spool, the serrated member having a plurality of projections formed on its outer periphery so as to be spaced apart;
    an operation member that is adapted to be mounted on the reel unit, the operation member being movable toward and away from the serrated member;
    a sounding member that is pivotably mounted on the operation member, the sounding member being movable in accordance with movement of the operation member between a sound generation position in which a tip of the sounding member can contact the projections of the serrated member and a release position in which the tip of the sounding member cannot contact the projections;
    a first urging member that urges the sounding member so that the tip of the sounding member is pointed substantially toward a center of the serrated member when the sounding member is in the sound generation position; and
    a second urging member that applies a greater urging force to the sounding member when the spool rotates in a line-releasing direction than when the spool rotates in a line-winding direction, while the sounding member is in the sound generation position, the sounding member including a support portion that is pivotably supported by the operation member, an engagement portion that extends radially outward from the support portion and is engaged with the first urging member, and a pawl portion that extends radially outward from the support portion in a direction that is different from a direction in which the engagement portion extends.

2. The sound generating device for a dual bearing reel set forth in claim 1, wherein the second urging member does not apply an urging force to the operation member while the operation member is moving toward or away from the serrated member.

3. The sound generating device for a dual bearing reel set forth in claim 1, wherein the second urging member is a torsion coil spring that is wound around an outer periphery of the operation member, a first end of the second urging member being engageable with the sounding member, a second end of the second urging member being engaged with the reel unit, and the first end of the second urging member comes in contact with the sounding member when the sounding member is in the sound generation position, and becomes separated from the sounding member when the sounding member is in the release position.

4. The sound generating device for a dual bearing reel set forth in claim 1, wherein the second urging member is a torsion coil spring that is wound around an outer periphery of the operation member, a first end of the torsion coil spring being engaged with the sounding member, and a second end of the torsion coil spring being engaged with the operation member.

5. The sound generating device for a dual bearing reel set forth in claim 1, further comprising a position retaining mechanism that retains the sounding member in one of the sound generation position and the release position by contacting the operation member.

6. The sound generating device for a dual bearing reel set forth in claim 1, wherein the first urging member is a coil spring, one end of the first urging member being engaged with the reel unit and the other end being engaged with the sounding member.

7. The sound generating device for a dual bearing reel set forth in claim 1, wherein the pawl portion has a tip that is tapered and contacts the projections of the serrated member.

8. The sound generating device for a dual bearing reel set forth in claim 7, wherein the engagement portion and the pawl portion form an acute angle therebetween.

9. The sound generating device for a dual bearing reel set forth in claim 1, wherein the second urging member does not apply an urging force to the sounding member when the spool rotates in the line-winding direction.

10. The sound generating device for a dual bearing reel set forth in claim 1, wherein the second urging member urges the sounding member by contacting the sounding member from a direction in which the sounding member swings when the spool rotates in the line-releasing direction.

11. A fishing reel, comprising:
a reel unit;
a handle disposed sideways in the reel unit;
a spool rotatably mounted on the reel unit so as to wind line; and a sound generating device that generates sound by rotation of the spool, the sound generating device including a disk shaped serrated member that is relatively unrotatable with the spool, the serrated member having a plurality of projections formed on its outer periphery so as to be spaced apart;

an operation member that is adapted to be mounted on the reel unit, the operation member being movable toward and away from the serrated member;

a sounding member that is pivotably mounted on the operation member, the sounding member being movable in accordance with movement of the operation member between a sound generation position in which a tip of the sounding member can contact the projections of the serrated member and a release position in which the tip of the sounding member cannot contact the projections;

a first urging member that urges the sounding member so that the tip of the sounding member is pointed substantially toward a center of the serrated member when the sounding member is in the sound generation position; and a second urging member that applies a greater urging force to the sounding member when the spool rotates in a line-releasing direction than when the spool rotates in a line-winding direction, while the sounding member is in the sound generation position, the sounding member including a support portion that is pivotably supported by the operation member, an engagement portion that extends radially outward from the support portion and is engaged with the first urging member, and a pawl portion that extends radially outward from the support portion in a direction that is different from a direction in which the engagement portion extends.

12. The fishing reel set forth in claim 11, wherein the second urging member does not apply an urging force to the operation member while the operation member is moving toward or away from the serrated member.

13. The fishing reel set forth in claim 11, wherein the second urging member is a torsion coil spring that is wound around an outer periphery of the operation member, a first end of the second urging member being engageable with the sounding member, a second end of the second urging member being engaged with the reel unit, and the first end of the second urging member comes in contact with the sounding member when the sounding member is in the sound generation position, and becomes separated from the sounding member when the sounding member is in the release position.

14. The fishing reel set forth in claim 11, wherein the second urging member is a torsion coil spring that is wound around an outer periphery of the operation member, a first end of the torsion coil spring being engaged with the sounding member, and a second end of the torsion coil spring being engaged with the operation member.

15. The fishing reel set forth in claim 11, further comprising a position retaining mechanism that retains the sounding member in one of the sound generation position and the release position by contacting the operation member.

16. The fishing reel set forth in claim 11, wherein
the first urging member is a coil spring, one end of the first urging member being engaged with the reel unit and the other end being engaged with the sounding member.

17. The fishing reel set forth in claim 11, wherein
the pawl portion has a tip that is tapered and contacts the projections of the serrated member.

18. The fishing reel set forth in claim 17, wherein
the engagement portion and the pawl portion form an acute angle therebetween.

19. The fishing reel set forth in claim 11, wherein
the second urging member does not apply an urging force to the sounding member when the spool rotates in the line-winding direction.

20. The fishing reel set forth in claim 11, wherein
the second urging member urges the sounding member by contacting the sounding member from a direction in which the sounding member swings when the spool rotates in the line-releasing direction.

* * * * *